United States Patent Office 2,756,237
Patented July 24, 1956

2,756,237

POLYALKANOL PYRIDINES AND PROCESS OF MAKING THEM

Francis E. Cislak, Indianapolis, Ind., assignor to Reilly Tar & Chemical Corporation, Indianapolis, Ind., a corporation of Indiana No Drawing. Application February 15, 1956, Serial No. 565,546

8 Claims. (Cl. 260—297)

This invention relates to polyalkanol pyridines and to the process of making them. More particularly, it relates to polyalkanol pyridines having the general formula:

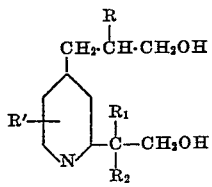

where R, R', $R_1$ and $R_2$ represent hydrogen or lower alkyl.

In general the compounds of my invention may be prepared by reacting formaldehyde with a 4-propanolpyridine which has as a substituent in the 2-position the group —$CHR_1R_2$ wherein $R_1$ and $R_2$ represent hydrogen or lower alkyl.

My invention will be described more fully in conjunction with the following specific examples. It should be understood, however, that these examples are given by way of illustration only, and my invention is not to be limited by the details set forth therein. The parts are by weight.

EXAMPLE 1

2-(1-ethan-2-ol)-4-(1-propan-3-ol)pyridine

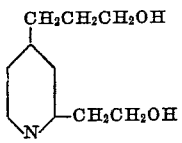

A mixture of about 900 parts of 2-methyl-4-(1-propan-3-ol)pyridine and 100 parts of paraformaldehyde is heated in a closed vessel at a temperature from about 150° C. to about 200° C. for from about one half hour to about one and one half hours. During the heating period the formaldehyde reacts with the methyl group of the propanolpyridine to form 2-(1-ethan-2-ol)-4-(1-propan-3-ol)pyridine. The latter compound is conveniently isolated from the reaction mixture by fractional distillation under high vacuum. As high a vacuum as can be attained (less than 1 mm. if possible) should be used to avoid decomposition of the high boiling (above about 300° C.) 2-(1-ethan-2-ol)-4-(1-propan-3-ol)pyridine.

The 2-(1-ethan-2-ol)-4-(1-propan-3-ol)pyridine is very soluble in water but only sparingly soluble in benzene.

I prefer to use a large excess of the propanolpyridine in my reaction mixture. By so doing, I avoid producing a large quantity of high boiling resinous by-products.

In place of the paraformaldehyde I may use an aqueous formaldehyde solution, such as the commercially available 37%–44% formalin.

If desired, I may use a condensation catalyst, such as, for example, ammonium persulfate. In general, I prefer not to use any catalyst.

EXAMPLE 2

2-(1-ethan-2-ol)-4-(1-propan-3-ol)-6-methylpyridine

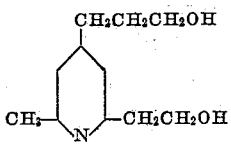

The procedure of Example 1 is repeated except that in place of the 2-methyl-4-(1-propan-3-ol)pyridine, I use 2,6-dimethyl-4-(1-propan-3-ol)pyridine.

EXAMPLE 3

2-(1-ethan-2-ol)-4-(1-2-methylpropan-3-ol)pyridine

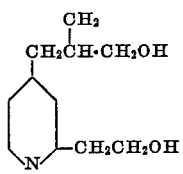

The procedure of Example 1 is repeated except that in place of the 2-methyl-4-(1-propan-3-ol)pyridine I use 2-methyl-4-(1-2-methylpropan-3-ol)pyridine.

The polyalkanol pyridines of my invention are useful in the manufacture of certain types of synthetic fibers. One of the newer and more acceptable synthetic fibers, Dacron, is a polyester of terephthalic acid and ethylene glycol. The dyeing properties of Dacron type fibers may be greatly enhanced by the use of a small percentage (3% to 7%) of the polyalkanol pyridines in the molecular make-up of the resin.

The polyalkanol pyridines of my present invention are also useful in the preparation of 4-alkanol-2-vinyl-pyridines. The process of preparing the 4-alkanol-2-vinylpyridines from the polyalkanol pyridines is the subject of my co-pending application Serial No. 569,236, filed March 5, 1956. The 2-(1-ethan-2-ol)-4-(1-propan-3-ol)pyridine may be converted to 2-vinyl-4-(1-propan-3-ol)pyridine as follows: The 2-(1-ethan-2-ol)-4-(1-propan-3-ol)pyridine, dissolved in about three parts of water, is preheated to a temperature of about 100° C. and then passed into liquid aqueous caustic soda of about 75% strength, maintained at a temperature of about 175° and being under partial vacuum. The hot caustic soda converts the 2-(1-ethan-2-ol)-4-(1-propan-3-ol)pyridine into 2-vinyl-4-(1-propan-3-ol)pyridine. The vapors of the vinylpyridine are condensed in any suitable receiver.

I claim as my invention:

1. Polyalkanolpyridines having the following general formula:

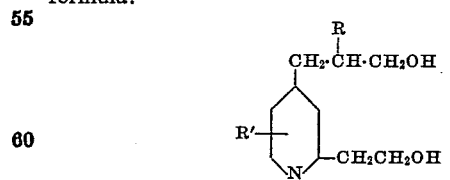

where R and R' are selected from the group consisting of hydrogen and lower alkyl.

2. The compound 2-(1-ethan-2-ol)-4-(1-propan-3-ol) pyridine.

3. The compound 2-(1-ethan-2-ol)-4-(1propan-3-ol)-6-methylpyridine.

4. The compound 2-(1-ethan-2-ol)-4-(1-2-methyl-propan-3-ol)pyridine.

5. The process of preparing the polyalkanol-pyridines of claim 1 which comprises mixing a compound having the general formula:

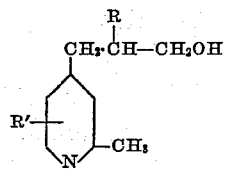

where R and R' are selected from the group consisting of hydrogen and lower alkyl, with formaldehyde, heating the mixture in a closed vessel at a temperature above about 150° C. and recovering the resultant polyalkanolpyridine.

6. The process of preparing 2-(1-ethan-2-ol)-4-(1-propan-3-ol)pyridine which comprises mixing 2-methyl-4-(1-propan-3-ol)pyridine with formaldehyde, heating the resultant solution above about 150° C. and recovering the 2-(1-ethan-2-ol)-4-(1-propan-3-ol)pyridine.

7. The process of claim 6 in which the propanol-pyridine used is 2,6-dimethyl-4-(1-propan-3-ol)pyridine and the polyalkanol pyridine recovered is 2-(1-ethan-2-ol)-4-(1-propan-3-ol)-6-methylpyridine.

8. The process of claim 6 in which the propanol-pyridine used is 2-methyl-4-(1-2-methylpropan-3-ol)pyridine and the polyalkanol pyridine recovered is 2-(1-ethan-2-ol)-4-(1-2-methylpropan-3-ol)pyridine.

References Cited in the file of this patent
UNITED STATES PATENTS 2,512,660    Mahan _____ June 27, 1950